United States Patent Office 3,250,802
Patented May 10, 1966

---

3,250,802
HYDROXY ESTERS FROM TERTIARY
ALKOXYALKYL ESTERS
Joseph A. Verdol, Dolton, Ill., assignor to Sinclair Research, Inc., Wilmington, Del., a corporation of Delaware
No Drawing. Filed Mar. 6, 1962, Ser. No. 177,749
8 Claims. (Cl. 260—475)

This invention is a process for obtaining polyesters or hydroxy materials which may be employed as intermediates for the preparation of polyesters or other polymer materials of desired properties. The invention employs as a starting material the tertiaryalkoxyalkyl ester of an organic acid. In the process the tertiarylalkoxyalkyl ester is subjected to heat in the presence of an acidic catalyst and, where suitable materials are employed, the process of this invention may be continued as an esterification reaction to produce solid polyesters.

The starting material is of the type

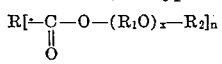

and the heating under acidic conditions gives the hydroxy material, or glycol half-ester

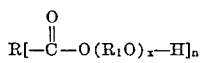

R is a hydrocarbon radical, preferably unsubstituted. R will generally be of 1 to 40 or more carbon atoms, preferably 2 to 20 carbon atoms, aromatic or straight, branched or cyclic aliphatic; it may be saturated or unsaturated and may be substituted with other materials or radicals which do not interfere with subsequent reactions of the product, e.g. polymerization, or uses of the polyester resin. The substituents or unsaturation may offer sites for cross-linking of polymer by methods other than esterification, or R itself may be the result of polymerization, for example, of acrylic acid derivatives. R is generally the hydrocarbon residue of a carboxylic acid. $R_1$ is a divalent hydrocarbon radical, for example alkylene, of 2 to 12, preferably 2 to 8, carbon atoms. This radical can be saturated or unsaturated, substituted (even with inorganic materials such as silicon or boron) or unsubstituted, aliphatic (including cycloaliphatic) straight or branched chain. Ordinarily —($R_1$O)— is the residue of a glycol and for a simple glycol residue the value of $x=1$. Where $x$ is a number greater than 1, the —($R_1$O)$_x$— radical is the residue of a polyglycol or ether glycol such as polyethylene glycol, polypropylene glycol, etc. Preferably $x$ is 1 to 5, although it may be up to about 25 or more. $R_2$ is a monovalent tertiary hydrocarbon radical of 4 to 10, preferably 4 to 7 carbon atoms. The tertiary radical has its valence bond to the ($R_1$O) group at the tertiary carbon of the $R_2$ radical. It is usually derived from a tertiary olefin, that is, one having a double bond at a tertiary carbon. $n$ is a number greater than zero, that is, one or more, preferably 1 to 6.

Of particular importance are those starting materials and hydroxy esters where R is derived from a polycarboxylic acid, for example, phthalic acid. In such situations the process of this invention enables polyesters generally of high molecular weight to be made for fiber or film production. For example, it is well-known in the art of preparing polyesters such as polyethylene terephthalate (commonly known as "Dacron" or "Terylene" in fiber form or as "Mylar" in film form) that it is difficult to produce high molecular weight polymer by reacting directly equimolar amounts of terephthalic acid (or its esters) and ethylene glycol under the usual conditions required for esterification or ester interchange. Glycol is lost by vaporization and this loss causes a stoichiometric imbalance between hydroxyl groups and carboxyl groups, and consequently polymerization steps when polymers of short chain lengths are formed.

The alternative to such a reaction is the use of an intermediate having the structure:

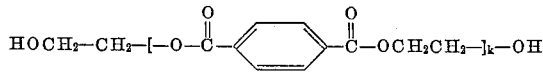

This intermediate is derived from terephthalic acid or a simple terephthalate and a large excess of ethylene glycol. However, this material is, in reality, a mixture of monomer and low molecular weight polymer in which mixture the value of $k$ varies from 1 to 3. The degree of polymerization (proportion of $k$ equal to 1, 2, 3, etc.) varies with the temperature, pressure and reactant ratios used in its production. Upon reaction of this intermediate with further phthalic acid or upon subjecting the intermediate to conditions which split off and vaporize ethylene glycol, polymerization occurs to produce a resin which is in reality a mixture of polymers of widely varying molecular weights. The actual preparation and isolation of a so-called monomer or pre-polymer intermediate (wherein $k$ equals 1) is difficult to carry out by direct esterification or ester interchange procedures, since higher molecular weight intermediates are always present. These higher molecular weight intermediates have physical and chemical properties similar to those of the pure monomer intermediate (wherein $k$ equals 1) and separation is therefore difficult. In practice, it is customary to use the mixture of pre-polymer or monomer intermediates (wherein $k$ varies from 1 to 3 on the average) for subsequent conversion to polyester, and this polyester, or rather polyester mixture, has a melting point of about 250 to 260° C.

Using the improvement of this invention a polyester of ethylene terephthalate having a melt temperature of about 270° C., indicating a high and uniform molecular weight, may be produced by employing bis(2-tertiaryalkoxyethyl) terephthalate as a starting material to prepare the intermediate

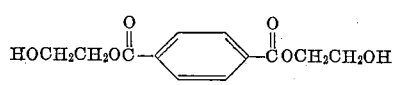

which may subsequently be polyesterified by release of ethylene glycol or by addition of further terephthalic acid.

The process of this invention therefore may be used to produce polyester resins having essentially the general formula

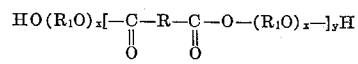

from the intermediate material

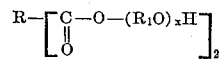

which in turn is produced from the tertiaryoxyalkyl diester

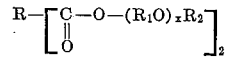

$y$ is a number, preferably large enough to give a solid polymer, for instance about 40 to 150, advantageously about 100 to 125.

Such polyesters may also be produced from the mixed tertiaryoxyalkyl ester

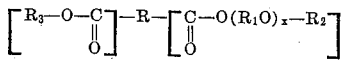

in which $R_3$ represents any element or radical which is easily broken from the carboxy group and removed during esterification. Usually $R_3$ is hydrogen or hydrocarbon, including oxyhydrocarbon; $R_3$ is monovalent and advantageously lower alkyl, preferably of 1 to 4 carbon atoms. The lower alkyl may be substituted to give an oxyhydrocarbon such as $[R_4—(OR_1)_x—]$ in which $R_4$ is hydrogen or non-tertiary lower alkyl.

The tertiary alkyl radical $R_2$ or

has as its parent the tertiary olefin $R_2'$ or

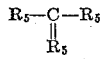

which has a double bond at the tertiary carbon. $R_5$ represents a lower alkyl. The tertiary alkyl radical, in the improved feedstock of this invention, is joined by an ether linkage to the alkyl or alkylene to give the tertiary alkoxy alkyl radical. This radical $$—(R_1O)_xR_2$$

or

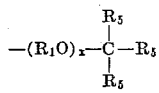

has, as its parent, the tertiary alkoxyalkanol $$HO(R_1O)_xR_2$$

or

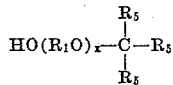

This radical is joined to an acid residue by an ester linkage. This radical is susceptible both to the breaking off of the tertiary olefin at the ether linkage to leave a hydroxy group in its place and to breaking off at the ester linkage under conditions of transesterification.

The R and $(R_1O)_x$ components of the starting material are chosen with a view to the desired product, since these components appear in the hydroxy ester intermediate product of this invention and a polymer product made $$\begin{array}{c} CH_2OH \\ \| \\ B(CH_2CH_2Ot—Bu)_2 \end{array}$$

(VII)

from this intermediate. Also, since the use of a starting material

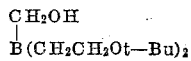

where $n$ is, for example, 2, to give the polyester $$HO(R_1O)_x[—C—R—C—O(R_1O)_x—]_yH$$
$$\qquad\quad\ \ \|\ \ \ \ \ \ \ \|$$
$$\qquad\quad\ \ O\ \ \ \ \ \ O$$

results in the production of the glycol $HO(R_1O)_xH$, the $(R_1O)_x$ component should be chosen to give a glycol easily removable during polymerization. Advantageously the simplest $(R_1O)_x$ and $R_2$ components are used, that is, isobutylene is the parent of the tertiaryalkyl radical and 2-tertiary butoxyethanol (the reaction product of isobutylene with ethylene gylcol) is the parent of the tertiary alkoxyalkyl radical when the ethylene glycol residue is suitable for appearance in a final product.

The starting tertiaryalkoxyalkyl ester may be manufactured according to methods set forth in my copending application Serial No. 177,747, filed of even date herewith and incorporated herein by reference. Usually the tertiary alkoxyalkyl ester is manufactured by an esterification reaction between the carboxylic acid which is to appear in the product and a tertiaryalkoxyalkanol containing an alkyl group which is to appear in the product. Typical acids which may be used to prepare the tertiaryoxyalkyl esters are acrylic and substituted and derived acrylic acids, such as crotonic and other butenic acids, oxalic acid, fumaric acid, maleic acid, sorbic acid, undecylenic acid, malonic acid, succinic acid, glutaric acid, adipic acid, pimelic acid, suberic acid, azelaic acid, sebacic acid, maleic acid, itaconic acid, citraconic acid, tricarballylic acid, phthalic acid, terephthalic acid, isophthalic acid, alkenyl succinic acids, oleic acid, ricinoleic acid, linoleic acid, linolenic acid, dimers of unsaturated fatty acids, diethyl vinyl acetic acids and the like, trimesic acid, and pyromellitic acid. Anhydrides or mono- or polyesters of these acids may be used as well as the acids themselves.

The oxyalkanols may be thought of as the reaction products of the etherification of a tertiary olefin, such as isobutylene, an isoamylene or an isohexene, with a glycol or other polyol whose residue appears in the product. The tertiaryalkyl ethers of the following glycols and polyols may be used in accordance with the present invention: ethylene glycol, diethylene glycol, polyethylene glycols, propylene glycol, polypropylene glycol, mixed ethers of ethylene and propylene glycols, butylene glycols, 1,5-pentanediol, 2-ethylhexane-1,3-diol, 1,10-decanediol, trimethylol propane, glycerine, neopentyl glycol, pentaerythritol.

In the case of diols the monotertiaryalkyl ether is employed. However, in the case of triols, tetraols and higher polyols, it is possible to use mono-, di-, or tri-tertiaryalkyl esters, just so long as at least one hydroxyl group is left free for esterification. It is also possible to use tertiary-alkyl ether derivatives of polyols which contain inorganic atoms, such as boron, silicon, aluminum, tin, lead, etc. The following are typical tertiaryalkoxyalkanols which may be used to give the starting material employed in this invention:

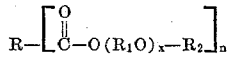

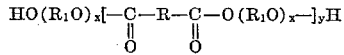

The tertiaryalkoxyalkyl ester is converted to the hydroxyalkyl ester by mild heating in the presence of an acid catalyst. Preferably the temperature is about 70 to 150° C. and atmospheric or near atmospheric pressure is used with the ether-ester in the liquid phase. The starting materials and desired results, however, may require temperatures as low as 50° C. to be used where polymerization or other reactions are to be avoided and these lower temperatures may in turn require pressure reductions in order to get complete vaporization of the tertiary olefin by-product. Likewise, temperatures as high as about 200° C. or more may be employed where the starting materials and products are not unduly deleteriously harmed by such conditions. Generally, the reaction takes place at the refluxing temperature of the hydroxyester product under the pressure conditions chosen.

The catalyst may be any acidic material, that is, any material which, according to the Bronstead theory, contributes a proton to the reaction mixture. Such acid-acting, solid, dispersible-solid, or liquid materials as sodium bisulfate, phosphotungstic acid, sulfuric acid, sulfonic acids, phosphoric acids, cationic exchange resins in the hydrogen form, etc., may be employed. Generally, the catalyst can be present in the reaction mixture in the minor amount of say about 0.01 to 0.2% or 2% or more.

The reaction may be carried out batchwise, or in a continuous flow system. If a continuous or semi-continuous system is used, a catalyst can be placed in the reactor or in the reactant and the tertiaryalkoxyalkyl ester starting material can be passed through the reactor at weight hourly space velocities of about 0.1 to 20. It is frequently desirable to conduct the reaction in a nitrogen atmosphere, preferably while bubbling nitrogen through the reaction mixture to carry off the tertiary olefin formed.

After the isoolefin is completely liberated the hydroxyalkyl ester may be recovered and utilized for the purpose desired. Polyesterification may be performed in the same reactor as the olefin liberation by adjusting the conditions prevailing.

Polyesterification takes place generally in the presence of a suitable ester interchange catalyst, at temperatures usually in the range of about 175 to 300° C. or more, preferably between about 220 and 270° C. Temperatures lower than about 175° C. may sometimes be employed but the temperature of polymerization will generally be at least about 25° C. higher than the olefin liberation temperature. Usually the transesterification will take place under greatly reduced pressure in order to remove glycol or the $R_3$ decomposition product as it is formed. The polymerization reaction often requires from 1 to 10 hours until it is complete. Reaction time depends upon the systems being polymerized, reaction temperatures, pressures, catalysts, etc.

The acid catalyst used for olefin liberation may be left in the product hydroxyester and may serve catalytic purposes also in the transesterification. However, the polymerization reaction rate appears to be slightly more rapid when an organo-heavy metal transesterification catalyst is used. Typical ester interchange catalysts which can be employed are, tetraisopropyl titanate, manganous acetate, dibutyl tin oxide, zinc stearate, litharge, etc. or other catalysts which are known. A combination of acid catalyst and heavy metal catalyst may be added to the starting tertiaryalkoxyalkyl ester to serve both reactions. For example, a mixture of manganous acetate and sodium bisulfate gave good results. It is also possible to mix a tetraisopropyl titanate catalyst with the sodium bisulfate prior to conducting the reaction. Catalyst concentrations for ester interchange are usually in the range of about 0.01 to 0.2%. Mixed polyesters of any desired composition can be prepared by mixing the desired amounts of the bistertiaryalkoxylalkyl esters of the respective acids prior to olefin liberation or by mixing the hydroxyesters prior to polymerization.

The following examples of the process of this invention should be considered illustrative only and not limiting.

EXAMPLE I

*Bis(2-hydroxyethyl) terepththalate and polyethylene terephthalate*

This example shows the conversion of bis(2-tertiarybutoxyethyl) terephthalate to polyethylene terephthalate while giving off isobutylene and ethylene glycol as shown in the equation:

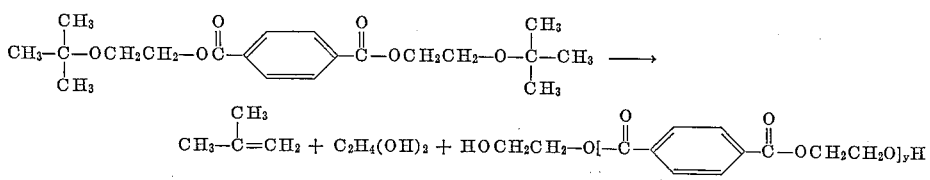

Into a 50-ml. flask containing a nitrogen inlet tube, thermometer, sidearm tube with condenser, and receiver was placed 21 grams of bis(2-tertiarybutoxyethyl) terephthalate and 0.1 gm. of sodium bisulfate. A Dry Ice trap was connected to the receiver to collect the isobutylene which was liberated during the reaction. The reaction mixture was heated slowly to reaction temperature, during which time nitrogen was bubbled into the liquid from the inlet tube. At about 105° C. isobutylene began to evolve from the reaction mixture. The temperature of the reaction mixture was slowly increased to 150° C. and isobutylene evolution was complete in less than one hour. A total of 0.11 mole of isobutylene was collected, indicating that the reaction was 100 percent complete. The resulting reaction mixture consisted of essentially pure bis(2-hydroxyethyl) terephthalate, part of which was recrystallized from chloroform to give a white crystalline solid having a M.P. 109° C.

*Analysis.*—Calcd.: C, 56.38%; H, 5.55%. Found: C, 56.34%; H, 5.62%.

The remainder of the reaction mixture was then heated slowly under vacuum until a maximum pot temperature of about 280° C. was obtained. During the course of the reaction, ethylene glycol distilled from the reaction mixture, and the mixture became extremely viscous. Although the reaction appeared to be complete in about 2 hours, heating was continued for a total of about 4 hours. The polymer had a melt temperature about 270° C. and it was possible to draw long fibers directly from the melt.

EXAMPLE II

*Bis(2-hydroxyethyl) maleate*

Into a 25-ml. flask containing a nitrogen inlet tube, sidearm tube with condenser and Dry Ice trap receiver was placed 9.62 grams of bis(2-tertiarybutoxyethyl) maleate and 0.1 gm. of sodium bisulfate. The mixture was heated at 90° C. for several hours, until evolution of isobutylene ceased. The product was filtered to remove the catalyst. The filtered product was a slightly straw colored liquid showing $n_D^{20}$ 1.4866, $D_4^{20}$ 1.3187.

*Analysis.*—Calcd.: C, 46.49%; H, 5.90%. Found: C, 47.06%; H, 5.92%.

EXAMPLE III

*Polyethylene maleate*

Twenty grams of bis(2-tertiarybutoxyethyl) maleate was charged to the polymerization flask described in Example I together with 0.1 gm. of sodium bisulfate. The mixture was heated, while maintaining a continuous flow of nitrogen through the reaction mixture. At a temperature of about 110° C. isobutylene was liberated slowly. The temperature was gradually increased to 150° C. whereupon the theoretical amount of isobutylene was liberated. When a temperature of 180° C. was reached the mixture was heated, under a vacuum of about 0.5 to 1.0 mm., for several hours. The reaction mixture became extremely viscous as ethylene glycol distilled from the mixture. Heating was continued for several hours after the distillation of glycol ceased. The final polymerization temperature was about 250° C. The product was a hard, brittle polyester resin.

EXAMPLE IV

*Polyethylene isophthalate*

Into a 50-ml. flask containing a nitrogen inlet tube, thermometer, condenser and receiver was placed 30 grams of bis(2-tertiarybutoxyethyl) isophthalate and 0.1 gram of phosphotungstic acid. After heating the mixture several hours at 70 to 120° C., isobutylene ceased collecting in the receiver. To the reaction mixture was then added 0.2 gram of tetraisopropyl titanate catalyst. Heating was continued several hours in vacuo, during which time ethylene glycol distilled from the reaction mixture. The product was a hard resinous material.

EXAMPLE V

Bis(2-hydroxyethyl) fumarate

Into a 25-ml. flask equipped with a nitrogen inlet tube, thermometer, receiver and Dry-Ice condenser was placed 5.84 grams of bis(2-tertiarybutoxyethyl) fumarate ester and 0.05 gram of phosphotungstic acid catalyst. The mixture was heated slowly while continuously bubbling nitrogen through the melt. When a temperature of 51° C. was reached, isobutylene began to evolve from the mixture. After about 5 hours of heating at 51 to 62° C., 1.1 gms. of isobutylene was collected in the Dry-Ice receiver. The product, which was a colorless liquid, showed $n_D^{25}$ 1.4858. Infrared analysis of the product showed the absence of t-butoxyethyl groupings and showed the presence of hydroxyethyl groupings.

EXAMPLE VI

Polyethylene fumarate

Twenty-five grams of bis(2-tertiarybutoxyethyl) fumarate was charged to a 50-ml. flask containing a nitrogen inlet tube, thermometer, condenser and receiver. To this mixture was added 0.1 gram of phosphotungstic acid and the mixture was heated to a temperature of 120° C., whereupon immediate liberation of isobutylene took place. To this mixture was then added 0.1 gram of tetraisopropyl titanate and the mixture heated in vacuo for several hours to a pot temperature of 260° C., whereupon a viscous, amber colored material was formed. This material solidified to a hard resin when cooled to room temperature.

EXAMPLE VII

Bis(2-hydroxyethyl)-2,2,5,5-tetramethyl adipate

Into a 25-ml. flask equipped with a nitrogen inlet tube, thermometer, condenser and Dry-Ice receiver was placed 4.65 grams of bis(2-tetriarybutoxyethyl)-2,2,5,5 - tetramethyl adipate and .05 gram of sodium bisulfate. The charge was heated at 70 to 105° C. until approximately 1 gram of isobutylene was collected. The liquid product was dissolved in chloroform and filtered to remove the catalyst. The chloroform was then removed by distillation in vacuo to give the colorless bis(2-hydroxyethyl)-2,2,5,5-tetramethyl adipate, which showed $n_D^{20}$ 1.4667. Analysis: percent C (calcd.) 57.91; percent H (calcd.) 9.02. Found: percent C 59.34; percent H 8.81.

Infrared analysis of the product showed that no tertiarybutoxyethyl groups were present in the product, but rather only hydroxyethyl end groupings were detectable.

EXAMPLE VIII

Polyethylene 2,2,5,5-tetramethyl adipate

Into a 25-ml. flask equipped with a nitrogen inlet tube, thermometer and condenser was placed 4.3 grams of bis(2-tertiarybutoxyethyl)-2,2,4,4 - tetramethyl adipate and 0.03 gram of sodium bisulfate. The reaction mixture was heated to 130° C. for about 2 hours, whereupon 1.2 grams of isobutylene was evolved and collected in a Dry-Ice trap. The reaction mixture was then heated in vacuo and the temperature gradually raised to 270° C. over a period of several hours. The reaction mixture thickened to a viscous material as the ethylene glycol was removed during this heating period. After the ethylene glycol ceased distilling from the mixture, it was cooled to room temperature. The product was a hard, amber colored resin.

EXAMPLE IX

Poly 3-methylphentyl terephthalate

Into a 25-ml. flask equipped with a nitrogen inlet tube, thermometer, condenser and receiver was placed 6 grams of bis(3-methyl-5 - tertiaryamyloxypentyl) terephthalate and 0.05 gram of phosphotungstic acid. The mixture was heated to 110° C. and isoamylene began distilling over rapidly. Heating was continued until 1.7 grams of isoamylene was collected. Heating was then continued for several hours in vacuo at 225° C. during which time 3-methyl-1,5-pentane diol was collected in the receiver. After distillation of the diol ceased, the reaction mixture was cooled at atmospheric pressure. A hard resinous polyester was obtained.

EXAMPLE X

Methyl 2-hydroxyethyl fumarate

Into a 100-ml. 3-necked flask equipped with a stirrer, thermometer and reflux condenser adjoined to a Dry-Ice trap was placed 12.63 grams of methyl 2-tertiary butoxyethyl fumarate, 22 grams of methyl ethyl ketone and 0.04 gram of phosphotungstic acid. The mixture was heated under reflux for 30 minutes, whereupon 2.3 grams of isobutylene was liberated. The mixture was neutralized with sodium carbonate to a pH of 7 and distilled. The product showed B.P. 102° C./0.07 mm. The product solidified to a solid; M.P. 32.5 to 33.5° C.

EXAMPLE XI

Hydroxyethyl crotonate

Into a 100-ml. 3-necked flask, equipped with a stirrer, thermometer, heating mantle and condenser leading to Dry-Ice traps was placed 15 grams of tertiarybutoxyethyl crotonate, 25 grams of methyl ethyl ketone, 0.05 gram of phosphotungstic acid. The tertiarybutoxyethyl crotonate had been prepared by the reaction at about 110° C. of tertiarybutoxyethanol and methyl crotonate in the presence of dibutyl tin oxide as an ester interchange catalyst, followed by vacuum distillation. The charge was heated under reflux for 25 minutes, whereupon 4.5 grams of isobutylene was liberated from the mixture. This corresponded to the theoretical amount of isobutylene which would be liberated for 100 percent conversion of the tertiarybutoxyethyl ester to the hydroxyethyl ester. The mixture was then treated with solid sodium carbonate (ca. 2 grams) and stirred until the mixture was neutral. The mixture was then filtered and the methyl ethyl ketone removed by distillation. Further distillation in vacuo gave 10.4 grams of hydroxyethyl crotonate B.P. 54 to 57° C./0.03 mm., $n_D^{20}$ 1.4617, $D_4^{20}$ 1.0765. Analysis: Percent C (calcd.) 55.37; percent H (calcd.) 7.75. Found: Percent C 55.47; percent H 7.76.

Infra-red analysis of the product showed characteristic absorption for the hydroxyl group, carbonyl group and primary ether group. No absorption for the tertiarybutoxy group was present.

EXAMPLE XII

Hydroxyethyl methacrylate

Into a 100-ml. flask fitted with a thermometer, stirrer, heating mantle and condenser affixed to a Dry-Ice trap was placed 12.63 grams of the tertiarybutoxyethyl methacrylate, prepared from tertiarybutoxyethanol and stabilized methyl methacrylate, 22 grams of methyl ethyl ketone and 0.04 gram of phosphotungstic acid. The mixture was heated under reflux whereupon immediate evolution of isobutylene occurred. After about 3 grams of isobutylene was liberated (reaction time of 40 minutes) the reaction was stopped and a small amount of sodium carbonate was added to neutralize the catalyst. The methyl ethyl ketone was then removed under reduced pressure. The residue was extracted with pentane, which caused precipitation of inorganic salts and polymer which formed during the reaction. The pentane extract was then evaporated to give essentially pure hydroxyethyl methacrylate, which, according to infra-red analysis, showed no impurities. The hydroxyethyl methacrylate showed $n_D^{25}$ 1.4569 and polymerized readily on distillation.

EXAMPLE XIII

Polyethylene itaconate

Into a 25-ml. flask equipped with a nitrogen inlet tube, thermometer, condenser and receiver was placed 4.5 grams of bis(2-tertiarybutoxyethyl) itaconate and 0.05 mole of sodium bisulfate. The mixture was heated under nitrogen about 2 hours at 100° C., after which time 1.4 grams of isobutylene was given off. Additional heating was conducted in vacuo for several hours to maximum temperature of 210° C. During this time ethylene glycol was liberated from the mixture. The product was an amber colored, hard resin.

EXAMPLE XIV

*Polyethylene itaconate*

Ten grams of methyl 2-tertiarybutoxyethyl itaconate was placed in a 25-ml. flask fitted to a Dry-Ice trap and vacuum system, and containing a nitrogen inlet tube. To this mixture was added 0.1 gram of phosphotungstic acid and a small amount of hydroquinone to prevent polymerization at the ethylene linkages. The mixture was heated to 70 to 80° C. whereupon isobutylene was liberated. Additional heating, above 100° C., caused distillation of methanol to occur, with concurrent polymerization. The mixture was heated for several hours in vacuo until a hard, brittle resin was obtained.

It can easily be seen that the present invention provides a novel and improved process for the preparation of hydroxyalkyl esters and for the production of high molecular weight polyesters, such as polyethylene terephthalate (Dacron, Terylene, or Mylar) which are difficult to prepare in pure form by conventional esterification or transesterification procedures, by employing a tertiaryalkoxyalkyl ester starting material.

It is claimed:
1. A method for the production of hydroxy esters of the type

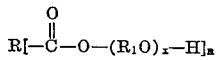

where
   R is a hydrocarbon radical of 2 to 20 carbon atoms,
   $R_1$ is a divalent aliphatic hydrocarbon radical of 2 to 12 carbon atoms,
   $x$ is a number from 1 to 5, and
   $n$ is 1 to 6, which comprises subjecting a tertiaryalkoxyalkyl ester of the type

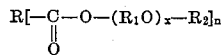

where $R_2$ is a monovalent tertiaryalkyl radical of 4 to 10 carbon atoms, to a temperature of about 50 to 200° C. in the presence of an acid catalyst, and removing tertiary olefin.

2. The method of claim 1 where $R_1$ is of 2 to 8 carbon atoms.
3. The method of claim 2 where R is the residue of a polycarboxylic acid of 3 to 21 carbon atoms and $n$ is at least 2.
4. The method of claim 3 where the acid is phthalic acid.
5. The method of claim 1 where $—(R_1O)_x—$ is the residue of ethylene glycol.
6. The method of claim 3 where the tertiary olefin is isobutylene.
7. A method for the production of bis(2-hydroxyethyl) phthalate which comprises subjecting bis(2-tertiarybutoxyethyl) phthalate to a temperature of about 50 to 200° C. in the presence of an acid catalyst and removing isobutylene.
8. The method of claim 7 in which the bis(2-tertiarybutoxyethyl) phthalate is bis(2-tertiarybutoxyethyl) terephthalate.

References Cited by the Examiner
UNITED STATES PATENTS

| | | | |
|---|---|---|---|
| 1,852,178 | 4/1932 | May | 260—75 |
| 2,727,882 | 12/1955 | Vodonik | 260—95 |
| 2,876,212 | 3/1959 | Cupury | 260—73 |
| 2,897,169 | 7/1959 | Dazzi | 260—78.4 |
| 3,044,970 | 7/1962 | Baumeister et al. | 260—89.5 |

OTHER REFERENCES

Hurd et al.: J. Am. Chem. Soc. 60, 2419–25 (1938).

JOSEPH L. SCHOFER, *Primary Examiner.*

JOSEPH R. LIBERMAN, *Examiner.*